Sept. 8, 1959   W. EBELING   2,903,252
BORING OF LARGE BORES USING AN ELONGATED GUIDE MEANS
IN A PREVIOUSLY BORED GUIDE PASSAGEWAY
Filed Aug. 16, 1954   3 Sheets-Sheet 1
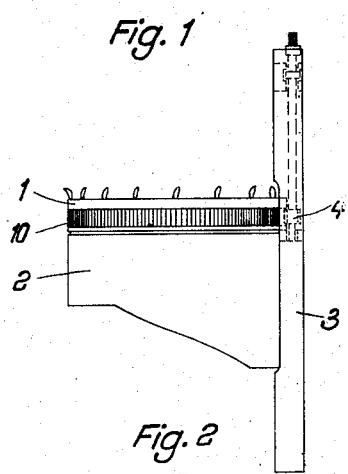
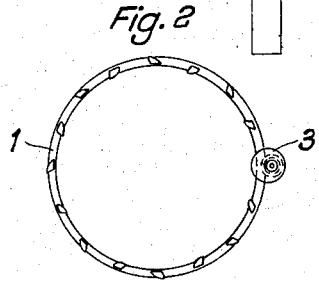
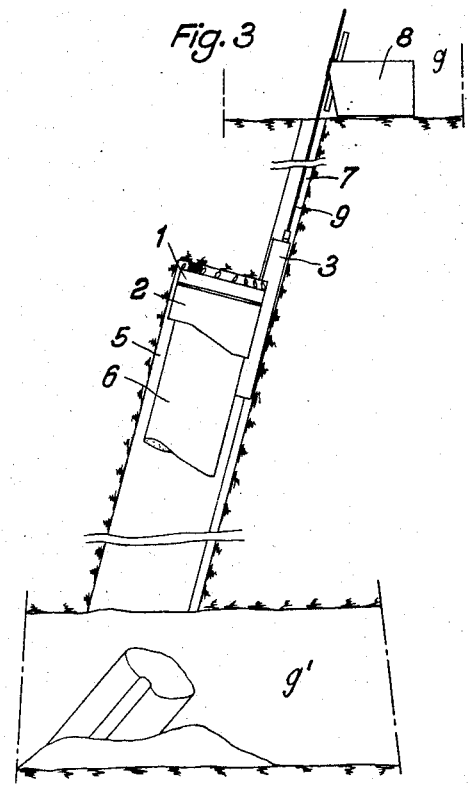
Inventor:
W. Ebeling Sept. 8, 1959 W. EBELING 2,903,252
BORING OF LARGE BORES USING AN ELONGATED GUIDE MEANS
IN A PREVIOUSLY BORED GUIDE PASSAGEWAY
Filed Aug. 16, 1954 3 Sheets-Sheet 3

Inventor:
W. Ebeling

2,903,252

BORING OF LARGE BORES USING AN ELONGATED GUIDE MEANS IN A PREVIOUSLY BORED GUIDE PASSAGEWAY

Wolfgang Ebeling, Hannover-Empelde, Germany

Application August 16, 1954, Serial No. 450,027

Claims priority, application Germany August 14, 1953

11 Claims. (Cl. 262—7)

The present invention relates to "improvements in and relating to the boring of large bores, more particularly in mines" and to a boring machine suitable for boring large bores in mines. By the term large bores is to be understood such subterranean workings as drifts, ventilation shafts, cross cuts, shafts, galleries and the like.

It is known to bore such large bores by methods which may be divided into two groups. The first group of methods is based on the excavation of the entire cross-section of the hole to be bored by crushing effected by a boring machine, either in one operation or by preliminary boring and subsequent extension boring. If the cutter is driven by a shank, this shank lies in the median line of the borehole, and the machine must withstand the full torque applied to the cutter, and must be correspondingly heavy. If the cutter is driven directly by a motor fed forward into the bore with the cutter, then also the dimensions and weight of the necessary machinery is very great on account of the large amount of rock to be crushed.

The second group includes the methods by which a hollow cutter forms a cylindrical core which is not crushed by the boring machine. What has been said hereinbefore concerning a shank in the case of machines carrying out the methods of the first group also applies to machines carrying out the methods of the second group. In addition, there are the disadvantages arising from the fact that the core is in the shank of the cutter and has to be removed from time to time of the boring work, being interrupted for this purpose.

According to the present invention, an endless carrier of cutting elements is moved in a plane perpendicular to the direction of feed of the machine by driving means located in one or more preliminary bores, the carrier being guided on support members in such manner that as the machine is fed into the face a core is cut out, which core corresponds in cross section to the configuration of the support members. The large bore obtained by boring may consequently be kept free of driving parts of the machine for such a distance that the core can be removed from the hole without interruption of the boring operation.

It is another object of the present invention to develop this method in such a manner that with the aid of a single boring machine cavities of practically any cross-section and any desired size can be produced. For attaining this object, in the first place a first bore hole is bored and thereupon further bores which intersect or are tangential to one another and are eccentric to one another are produced in such a manner that in each case the bore hole or holes acts or act as a guide for the boring tool, when the next following boring hole is being bored.

Cavities which can be bored by this method may be shafts, galleries or workings.

For boring shafts and galleries forward driving arrangements are hitherto known, which produce a gallery or shaft cross-section determined by their construction. These forward driving machines are relatively large, heavy and costly, as they have to work out in one working operation at least the whole of the outer contour of the finished shaft or gallery cross-section.

Methods, in which through cutting or slotting by the repeated application in rapid succession of the cutting or slotting tools in different positions the final contour of the gallery or shaft cross-section is proudced, are not so efficient, owing to the intermittent mode of operation, and require either a complete chipping of all the material to be conveyed away or a periodic interruption of the cutting work, so as to be able to release and remove the partially exposed cores. In steep workings or drain pits large cutting or slotting machines have hitherto not been used, owing to the difficulties in guiding and handling them.

For the completely mechanical mining of extensive faces, there are known, besides the stripping methods which are only applicable in soft coal, cutting methods, in which the cutting machine either requires an artificial guidway, for instance the stage of the long work conveying means, or moves along step by step by means of gripping devices. The latter method again involves an intermittent mode of operation and a complicated, clumsy construction.

The basic idea underlying the present invention consists in this that the cavity cross-section to be bored is produced by a number of successive operations of a large bore boring or cutting machine, the machine being guided along the walls of the formed cavity. With this method it is possible to produce with a single boring or cutting machine cavities of practically any cross-section, without the necessity of installing or cutting in special guideways or tracks. This does away with the above-mentioned disadvantages, namely large machines determining the gallery or shaft cross-section, an intermittent mode of operation and special guideways.

The method is particularly suitable in steeply dipping and vertical places, where it enables difficult and dangerous manual labour in the sump to be entirely or at least very substantially eliminated.

Ring or frame cutting machines may be used with particular advantage for the new method, when they are so constructed as to enable the first large bore to be made from a relatively small preliminary bore hole. It will then be possible to operate entirely automatically from the start, apart from the device for making the small preliminary bore hole, and an interruption in the working will be greatly reduced, if supporting ribs be left standing in the seam, which may eventually act as walls for stowing backfilling.

The possibility presented by the invention of using frame or ring cutting machines in the steep heading presents the further advantage for coal mining, that with mechanical working it is possible, even in steep places, to get coal in large pieces.

It may be expected, that the fully mechanical working of steep seams and the fully mechanical boring of shafts and large excavations by the novel methods will lead to great improvements.

Further details of the invention are further described with reference to the accompanying drawings, which show some preferred embodiments of the present invention, and in which:

Fig. 1 shows, in front elevation, a large-bore boring machine in accordance with the invention.

Fig. 2 is a plan view of Fig. 1,

Figure 4:
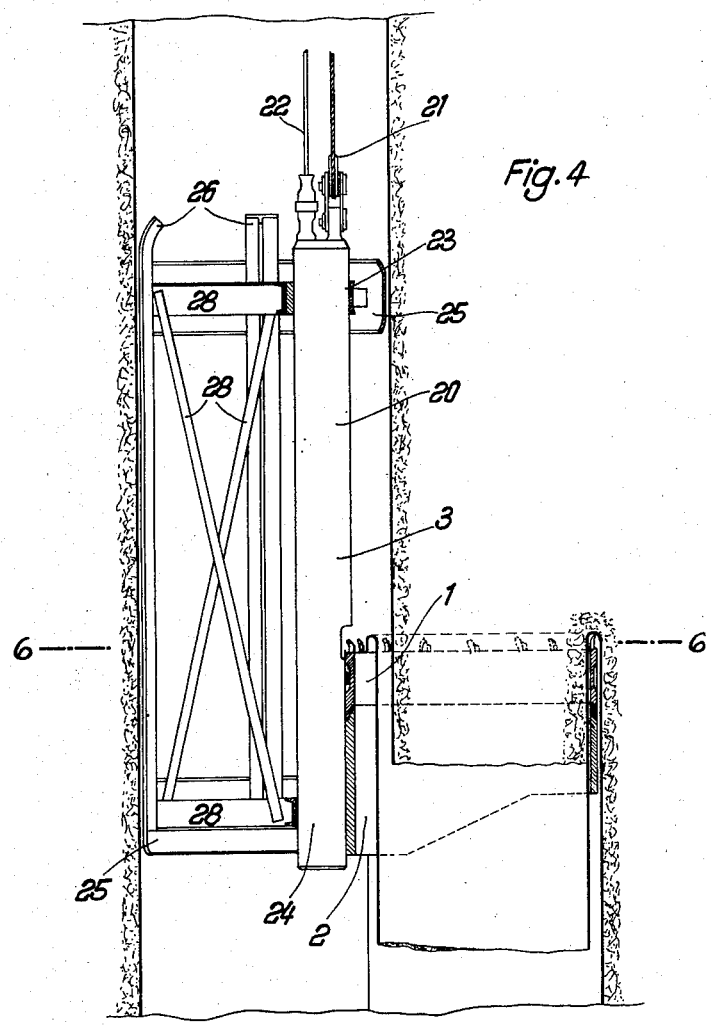
Figure 5:
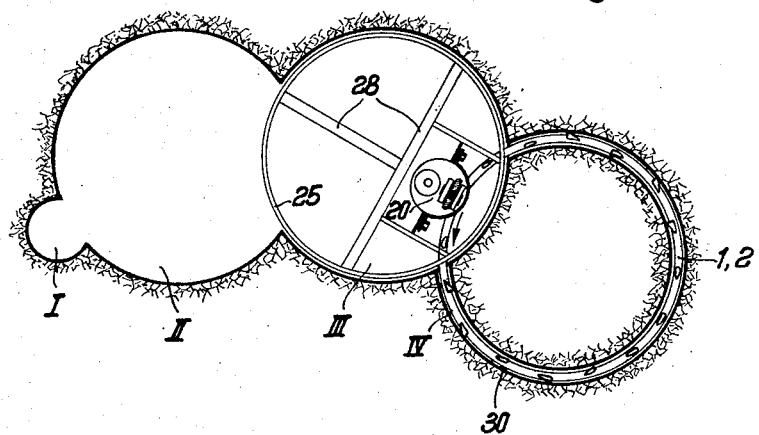
Figure 6:
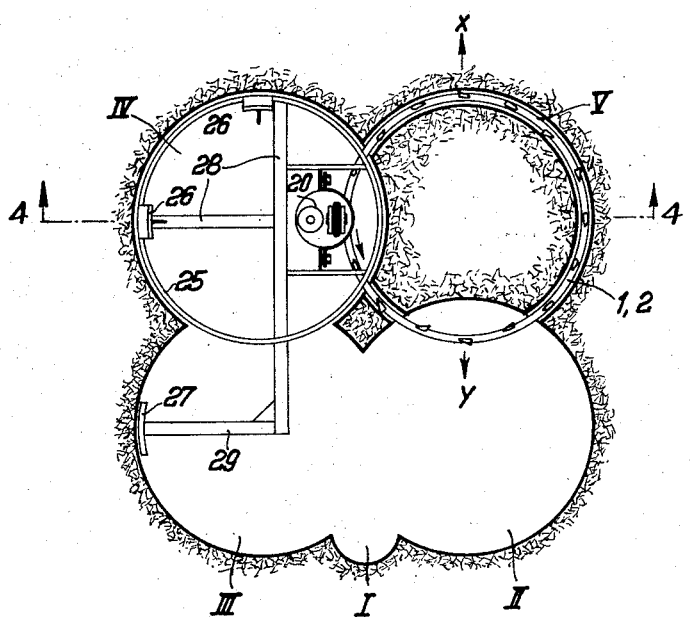

Fig. 3 shows schematically the large-bore boring machine in operation between galleries G and G', Fig. 4 shows a boring machine enlarging an already cut bored shaft and is a section taken on line 4—4 of Fig. 6, Figs. 5 and 6 show in section two applications of this method, and Fig. 6 is a section taken on line 6—6 of Fig. 4.

The cutting element carrier may be a rigid circular ring 1. The cutting elements on the ring 1 engage the face when the ring is pressed towards the face by suitably shaped supporting members 2 which correspond in cross-section to that desired for the bore. The drive of the cutting element carrier may be effected by a pinion 4 and gear 10.

The cutting element on said carrier forms a kerf 5 in the solid ground said kerf corresponding in shape to the guided path of the cutting element carrier's outer limit, the kerf forming the wall of the finished bore, and the inner limit being a core 6.

This kerf merges into one or more preliminary bores 7, in which driving and guiding members 3 are accomplished. Since the drive is located at the periphery of the large bore, it is not obstructed by the stationary core. Thus core boring which progresses towards the driving point 8 i.e., which is pulled in the direction of cutting by the driving machinery instead of being pushed, as is the case in the core drills etc., is possible (Fig. 3). Fig. 3 shows a preliminary bore between galleries G and G' with drive 8 in gallery G and a broken core in gallery G'.

The preliminary bore or bores 7 may be made by one of the known boring processes (Fig. 3) before commencement of the main operation which results in the finished large bore.

The driving motor may be accommodated in the machine itself. It must then be placed in one of the preliminary bores. The drive 8 drives the cutter ring from the outside by means of a link transmission system 9.

If the preliminary bore is made with a prospecting drill 8, it is probably expedient to drive the large-bore boring machine eccentrically disposed thereto by means of the same prospecting drill and its link system (Fig. 3). The power requirements and force relationships of the two machines may be easily balanced.

If the preliminary bore is accessible at both ends, the pulling boring process may be applied (Fig. 3), whereby the bored out cross-section is completely free for the removal of the core 6.

With slightly inclined or horizontal large bores, such as galleries, boring on the one hand and removal of the core, which is possibly disintegrated by blasting or by other suitable methods, on the other hand, may be carried out simultaneously.

With sharply inclined bores and raises, the core slides out of the borehole under gravity after it has been released from the ground by its own weight or it may be forcibly ejected from the bore (Fig. 3). This makes possible continuous core boring for great lengths and the core boring of large bores even in rock which offers high resistance to the removal of the core.

The large bore boring machine illustrated in Fig. 4 for carrying out the method is an annular cutting machine 1, 2 with an attached motor 20 for driving it, which is connected to an electric cable 22 and is drawn upwards by a cable 21 from the upper opening of the steep drift at the boring feed rate. The motor 20 is so shaped as to find accommodation in a preliminary bore hole I (Figures 5 and 6), and in this preliminary bore hole it guides the annular cutting machine when boring the large bore II.

When the large bore II has been bored, it acts during the boring of the large bore III as means for guiding the annular cutting machine 1, 2, a guiding arrangement 25—29 being fixed on the machine at 23 and 24. This guiding arrangement is provided, aside from arrangements for securing the large bore boring machine 1, 2, with guide rings 25 of a shape so as to comply with the shape of the wall of the excavation, for instance, the wall of the large bore II, and/or guide runners 26 and 27 and the requisite connecting struts 28 or 29.

The driving members of the large bore boring machine need not, as shown in Figures 4 to 6, when boring the bore III and the subsequent bores IV and so on, be the same as when boring bore II, but can be designed so as to make use of the larger available cross-section and may take other changed circumstances into account, such as better ventilation.

The method according to the invention for boring extended cavities, such as shafts, galleries and long work, consists in the employment of the above described guiding device for a large bore or gallery forward feed machine, after the production of a first large bore II by the same large bore boring machine or in any other way. The eccentric arrangement of the boring machine leads to the widening of the bore to one side through the formation of part of the next following large bore III or IV, V and so forth. The guiding arrangement transmits on the one hand through its longitudinal extension the tilting moment produced by the eccentric suspension of the boring machine. On the other hand it also transmits the reaction moment produced by the cutting tools. This reaction moment is transmitted either by the guiding skids on the large bore boring machine and guiding elements of the guiding arrangement or by the guiding arrangement alone, through guiding skids 27 mounted on outriggers 29 bearing against the walls of further preliminarily bored holes.

The invention thus affords a basis for a great number of new possibilities in boring large bores mechanically, where the prior disadvantages of the previous processes are substantially diminished and in part entirely overcome. It should be especially mentioned in this connection that new possibilities for the core boring of large bores are opened up, and that the boring machines in accordance with the invention can be made relatively light, easy to dismantle, and cheap, whereby their use promises to become particularly economical and requires only very short times for installing them.

What we claim is:

1. A method of forming a large bore in a rock formation comprising the steps of first completely boring a preliminary bore in a position to lie in the margin of the desired bore, inserting a part of a large-bore boring machine into one end of said preliminary bore, gradually drawing said boring machine from the other end of said preliminary bore and toward said other end while using the wall of said preliminary bore as a guide for said part, and simultaneously cutting a kerf in the form of a loop intersecting said preliminary bore in a direction parallel to said preliminary bore, while using the wall of said preliminary bore together with said part as cooperating guides for cutting said kerf so as to form a core of substantially the same cross-sectional size as the desired bore, and breaking off and removing said core periodically as said boring machine is being drawn toward said other end of said preliminary bore and as said kerf is being cut, and further comprising the steps, following the completion of said large bore, of inserting said part of said boring machine into one end of said completed large bore, and slidably bracing said part against the walls of at least said completed large bore, and then repeating the mentioned cutting operation by utilizing said completed large bore as a preliminary bore for guiding said part of said boring machine while drawing said part to the other end of said completed bore and simultaneously cutting the next large bore intersecting with said previously completed large bore.

2. A method as defined in claim 1, wherein, during the repetition of said operation for cutting the next large bore, at least a part of the elements used for bracing said part of the boring machine against the walls of at least said completed bore are secured to said part and are drawn with said part through said completed bore serving as a preliminary bore.

3. A boring machine for boring large bores in mines comprising a looplike hollow support member, an endless carrier mounted on and movably guided along the forward edge of said support member, said support member and said carrier each having an outer cross-sectional shape and dimensions substantially corresponding to the cross-sectional shape and dimensions of the large bore to be cut by said machine, and an inner cross-sectional shape and dimensions substantially corresponding to the outer cross-sectional shape and dimensions of the core to be cut out by said machine when forming said bore, cutting means mounted on the forward edge of said carrier for cutting a kerf to form said large bore, guiding means including at least one elongated guide member having an outer diameter smaller than the diameter of a preformed borehole and having a longitudinal axis extending parallel to the axis of the large bore to be cut, and being secured to the outside of the wall of said support member and eccentrically to said member so that said preformed borehole and said large bore when cut will intersect with each other, means mounted on said guide member for driving said carrier and said cutting means thereon along said forward edge of said support member, said guide member having at least a forward end portion projecting substantially beyond said support member, said carrier and cutting means, at least one point on said projecting forward end portion facing substantially toward the axis of the large bore to be cut being adapted slidably to engage with and to be guided by the wall of said preformed borehole, the rear end of said guide member having at least one point substantially diametrically opposite to said point on said forward portion adapted slidably to engage with and to be guided by the portion of the wall of said preformed borehole remaining behind said cutting means while said cutting means progressively cut said large bore intersecting with said preformed borehole, draw means connected to said projecting forward end portion of said guide member extending through said preformed borehole ahead of said guide member to the forward end of said borehole, and means mounted at said forward end of said preformed borehole to receive said draw means to pull said guide member through said preformed borehole while said cutting means progressively cut said kerf and form said large bore, whereby the tilting forces caused in said support member, said carrier, and said cutting means by the eccentric position thereof relative to said drawn guide member, as well as by the cutting operation of said cutting means will be taken up by the wall of said preformed bore.

4. A boring machine as defined in claim 3, wherein said driving means for said carrier and cutting means comprise a motor mounted at the forward outer end of said preformed borehole, and motion-transmitting means connecting said motor to said guide member and being guided within the forward end portion thereof and connected to said carrier and cutting means for driving the same.

5. A boring machine as defined in claim 3, wherein said driving means for said carrier and cutting means comprise a motor, said motor being mounted within said guiding means and driving means connecting said motor to said carrier and cutting means for driving said carrier and cutting means.

6. A boring machine as defined in claim 3, wherein said guiding means further comprise at least one frame removably secured to said guide member for extending the diameter thereof for use in a large preformed bore, said frame also having a forward end portion projecting substantially as far forwardly as said end portion of said guide member and having at least one point thereon facing substantially toward the axis of the next large bore to be cut and adapted slidably to engage with and to be guided by the wall of said preformed large bore, said frame also having at least one point on its rear end adapted slidably to engage with and to be guided by the wall of said large preformed bore at a point substantially diametrically opposite to said point on said forward end portion.

7. A boring machine as defined in claim 6, wherein said frame is of a skidlike shape extending substantially along the entire length of said guide member.

8. A boring machine as defined in claim 6, wherein said frame comprises guide rings removably secured to said guide member near its front and rear ends thereof and having a diameter substantially corresponding to the diameter of said large preformed bore for adapting said guiding means to the diameter of said bore and for cutting the next large bore eccentrically but parallel thereto, said guide rings being adapted slidably to engage with and to be supported by the wall of said preformed large bore.

9. A boring machine as defined in claim 8, wherein said guiding means further comprise a guide element connected to said guide member and adapted to extend into another preformed borehole extending parallel to said large bore previously cut, said guide element being adapted slidably to engage with the wall of said other preformed borehole and, in cooperation with said frame in said large bore previously cut, to compensate the torque produced in cutting the next large bore.

10. A boring machine as defined in claim 3 wherein said guiding means further comprise at least one frame removably secured to said guide member for extending the diameter thereof for use in a large bore previously cut as described so as to permit said large bore to be used in substantially the same manner as said preformed borehole for cutting the next large borehole.

11. A boring means to be guided by a previously bored guiding passage for boring large bores, comprising a circular hollow support member providing a leading and a trailing edge, an endless circular cutter element mounted for circumferential movement on the leading edge of said support, said cutter element being wider, in the radial direction, than said support, guiding means for said support member formed as an elongated cylinder of a diameter to slidably engage in said guiding passage and presenting a cylindrical guiding surface extending parallel to the axis of said support member and extending to a forward end substantially forward of the leading edge of said support member and substantially rearwardly of said cutter element, said support member intersecting said guiding means and said guiding means being cut away adjacent the leading edge of said support member so as not to obstruct the motion of said cutter element, means mounted within said guiding means to move said cutter element circumferentially on said support member, the said guiding member being provided with means at its forward end for connection to a cable whereby said boring means may be pulled in a cutting direction guided by said guiding means slidably engaged in a previously bored hole of a size to receive said guiding means.

References Cited in the file of this patent

UNITED STATES PATENTS

| 1,522,693 | Morgan | Jan. 13, 1925 |
| 2,637,542 | Yarmak | May 5, 1953 |
| 2,775,439 | McCarthy | Dec. 25, 1956 |

FOREIGN PATENTS

| 517,596 | Belgium | Feb. 28, 1953 |
| 979,913 | France | Dec. 13, 1950 |
| 830,335 | Germany | Feb. 4, 1952 |